United States Patent [19]

Mock

[11] Patent Number: 5,790,285
[45] Date of Patent: Aug. 4, 1998

[54] LIGHTWAVE COMMUNICATION MONITORING SYSTEM

[75] Inventor: Joel Leslie Mock, Norcross, Ga.

[73] Assignee: Lucent Technologies Inc., Murray Hill, N.J.

[21] Appl. No.: 651,945

[22] Filed: May 21, 1996

[51] Int. Cl.$^6$ ............................................... H04B 10/08
[52] U.S. Cl. ............................................ 359/110; 356/73.1
[58] Field of Search ................................. 359/110, 124, 359/127, 173, 177; 356/73.1

[56] References Cited

U.S. PATENT DOCUMENTS

| | | | |
|---|---|---|---|
| 4,896,935 | 1/1990 | Lee | 350/96.2 |
| 4,946,236 | 8/1990 | Dautartas et al. | 350/96.2 |
| 5,329,392 | 7/1994 | Cohen | 359/124 |
| 5,528,404 | 6/1996 | MacKichan | 356/73.1 |

FOREIGN PATENT DOCUMENTS

| | | | |
|---|---|---|---|
| 0560426 | 9/1993 | European Pat. Off. | 359/110 |

*Primary Examiner*—Kinfe-Michael Negash

[57] ABSTRACT

A lightwave communication monitoring system has a monitoring member to which are applied signals extracted from one or more fibers in a transmission system. The monitoring member detects the signal and applies a signal derived therefrom to a control or processing unit. When the strength of the derived signal is below a predetermined minimum, the control unit is adapted to activate a fault location member which applies a fault location signal to the fiber circuit in which the signal, or lack thereof, is transmitted. The system is capable of handling a plurality o fiber circuits simultaneously. In another embodiment of the invention, a test signal is launched on the first fiber, or, simultaneously launched on a plurality of first fibers of fiber pairs, and the test signal is simultaneously extracted from one or more of a plurality of corresponding second fibers of the fiber pairs. The system also includes means for measuring the strength of the transmission signals, which are at a different frequency from the test signal.

29 Claims, 2 Drawing Sheets

LIGHTWAVE COMMUNICATION MONITORING SYSTEM

FIELD OF INVENTION

This invention relates to fiber optic communication systems and, more particularly, to a method and apparatus for monitoring the transmission characteristics of such systems.

BACKGROUND OF THE INVENTION

In the telecommunications field, optical fibers and optical fiber cables are becoming, or have become, the transmission media of choice, primarily because of the tremendous bandwidth capabilities and low loss of such fibers.

Unfortunately, optical fibers, themselves, are quite delicate and can be easily broken or cracked to the extent that the signal transmission characteristics of the fiber are impaired.

Further, when numerous fibers are contained in a cable, they are subject to stresses and strains when the cable is laid, especially when it is pulled or sharply bent. To prevent such potential damages, cables have been designed to allow pulling and bending thereof without unduly stressing the individual fibers contained within the cable. However, even with such cables, the fibers can be damaged by storms, rodent burrowing, shifting earth, or by accidents during excavation and laying, as well as by subsequent digging, as with a backhoe, in the area of the laid cable. Aerial mounted or strung cables are likewise often subject to severe stresses, primarily to storms, high winds, and the like.

In telecommunication systems, the amount of optical signal traffic typically carried by just one pair of fibers in a cable can generate thousands of dollars per minute for the operator. It follows, therefore, that there is a compelling need for monitoring an optical fiber telecommunication system in order to ascertain the occurrence of an event, or predict the occurrence of an event which impairs signal transmission on a fiber and, equally important, to ascertain the location within the system of the event. Inasmuch as every minute of down time for a fiber or fiber pair can result in considerable monetary loss, the elapsed time involved in precisely locating the event should be minimized as much as possible.

There have been numerous arrangements proposed for monitoring an optical fiber signal transmission system, with elapsed time from occurrence of the event to precise location of the fault ranging from five minutes to seventeen hours, for example. In general, the emergency response procedure is as follows. When an alarm sounds at a control center, the operators are made aware that there is a problem, i.e., event somewhere in the network. After a verification of the integrity and operation of the transmission equipment, a conclusion is reached that the problem is with the cable, and an emergency crew is dispatched in the general direction of the fault. The crew is usually, or should be, equipped with an optical time domain reflectometer (OTDR), a test instrument that generates its own optical signal, launches it into the fiber, and measures the elapsed time of reception for the signal reflection from the fault. The elapsed time affords a measurement of distance from the reflectometer to the fault. The crew connects the OTDR to the cable, hopefully in the vicinity of the fault or event, and obtains a reading of the optical distance to the fault. With the aid of a map of the network, the crew can then precisely determine the geographic location of the fault or event. A typical cable or, more particularly, fiber break can take hours to locate using the foregoing procedures, and as a consequence, emphasis has been on reducing this elapsed time to a minimum.

One proposed system, the Fiber Check 5000 of Photon Kinetics, as shown in a 1001 marketing brochure, is a sophisticated monitoring and test system utilizing three basic components, a control center, a plurality of "acquisition units" and a plurality of optomechanical switches, all of which are fixed in place throughout the system. The system controller is a CPU or computer having the capability of an optical time domain reflectometer and of maintaining a data base describing the route of each cable and fiber identification. Each acquisition unit, generally located in a central office, exchange, or the like, is functionally equivalent to an OTDR, with its test results being communicated to the CPU via modem. When an event occurs, the CPU can page the various acquisition units until the fault is located. The OTDR function enables the acquisition unit in combination with the CPU to pinpoint the precise location of the event. The electromechanical switches, located with the acquisition unit, make it possible to test each optical fiber in the cable at the event site, or at the acquisition site closest thereto, to ascertain which one or ones are faulty. Such a system is capable of rapid location of a fault or other event, however, it relies heavily on a large number of fixed components essential to its fault detection, fault location and monitoring functions.

Present day monitoring and fault location systems necessarily include some means for testing individual fibers in order to ascertain exactly which fiber or fibers have a fault, such as a break. Such testing is generally made possible through the use of light guide cross-over switches. An example of such a system for testing individual fibers is disclosed in U.S. Pat. No. 5,329,392 of Cohen, wherein the apparatus for switching an OTDR among several individual fibers is shown. In the Cohen system, a monitoring component is placed between the external optical fibers portion of a fiber optic terminal system and the internal fibers within a central office. The monitoring component consists of planar "main" waveguides formed on a substrate which connect to the individual fibers. Monitor waveguides are connected, by means of directional couplers, to individual monitoring devices. In addition, OTDR signals are applied to the main waveguides by means of wavelength division multiplexors, which are connected through a 1×N optical switch to the OTDR. The output of the waveguide component is connected through a M×N cross connect switch to the external fibers leaving the central office.

There are numerous arrangements in the prior art for switching among optical fibers, to achieve M×N switching, where M and N=1,2,3, - - - . One preferred switching system is the so-called moving fiber switch, which utilizes external forces to change the location of the fibers within the switch. A switch of this type is shown and described in U.S. Pat. No. 4,946,236 of Dantartas, et al., which functions as 1×2, 2×1, 2×2 switch. In that switch, the fibers are physically moved by means of magnetic forces to one of two positions, thereby achieving cross connection. A more versatile switch structure having a 1×N capability is shown in U.S. Pat. No. 4,986,935 of Lee. In that switch, an array of N fixed fibers is arranged in a semi-circle around a rotatable member having a single fiber mounted therein and aligned along the central axis of the semi-circle. The rotatable member is rotated by a stepping motor and the angular orientation of the fixed fibers is such that the single fiber is optically aligned with any selected one of the fixed fibers by means of the stepping motor. In order to assure adequate signal coupling, appropriate lenses on the ends of the fibers are used to expand or to collimate the light. As a consequence, the single fiber is switched to the desired fixed fiber upon proper command to the stepping motor. Such a 1×N switch is suitable for use, for example, with the arrangement of the Cohen patent for switching the OTDR signal to the desired waveguide for testing.

From the foregoing, it can be appreciated that the switch arrangements of the prior art as used in fiber monitoring and testing, are limited simply to switching among the various fibers in order to connect the monitoring apparatus thereto. Further, it is still necessary in prior art systems that the monitoring be performed by fixed elements strategically located throughout the system. OTDR based remote fiber testing systems (RFTS) generally require approximately three minutes for trace acquisition and processing per fiber. Thus, a worst case scenario for a twenty-four fiber cable test is seventy-two minutes, which, as pointed out heretofore, can result in considerable lost revenue. Most RFTS systems that are linked with transmission system performance hardware must be adapted to the protocols of each manufacturer's proprietary system, which is especially undesirable from an economic standpoint. Independent and surveillance architecture is much to be preferred. Typical commercially available RFTS are based on centralized data acquisition and processing platforms, whereas a distributed surveillance architecture allows greater flexibility and is more fault tolerant.

SUMMARY OF INVENTION

The present invention is directed to the monitoring of optical fiber transmission paths and to fault location therein when faults occur. More particularly, the invention, in the several embodiments thereof hereinafter disclosed, is a real time optical transmission monitoring system which provides extremely rapid fault detection times compared to prior art remote fiber testing systems (RFTS), and which functions independently of the protocols of a manufacturer's proprietary transmission system. Thus, the system of the invention is of independent test and surveillance architecture. The system provides continuous power monitoring on a per channel basis and overcomes the problem inherent in most OTDR type systems of adjacent channel unavailability during an OTDR measurement cycle.

The system of the invention, in the several illustrated embodiments thereof relies for operation on a unique optical switch shown and described in U.S. patent application Ser. No. 08/653,373 of Joel Mock (Mock 3), filed concurrently herewith and herein incorporated by reference, or the equivalent thereof. That switch, in addition to performing a basic switching function common to most LGX switches, also permits simultaneous monitoring, fault location, and measurement of the unaccessed fixed switch ports. As is described fully in the aforementioned Mock application Ser. No. (Mock 08/653,373 the switch, in a 1×N configuration, comprises an array of fixed fibers supported on a plate and extending therethrough. The fibers are preferably terminated in collimating lenses. Opposite the fiber array and spaced therefrom is a plate supporting an array of light devices, such as photo-detectors, each individual light device being aligned with a corresponding fixed fiber end to define an individual light path. By light devices is meant any of a number of types of devices, which produce light or respond to light such as photodetectors, light emitting diodes, lasers, photo-diodes, and the like, and which may be arrayed in any of a number of combinations, as will be apparent hereinafter. In the space between the two arrays is an armature bearing a single common fiber, the position of which is controlled by a step motor. In all positions but the reset or home position, the common fiber is aligned with one of the fixed fibers. As will be apparent hereinafter, such a unique switch configuration makes possible a variety of real time optical power or signal monitoring systems in independent test and surveillance architecture, regardless of the architecture of the transmission systems being monitored.

In a first embodiment of the fiber monitoring system of the invention, utilizing, as a monitoring means, the switch disclosed in the aforementioned Mock application Ser. No. 08/653,373, a wavelength division multiplexer (WDM) is located adjacent the receiving end of the optical fiber cable in a transmission system, there being one WDM per channel or fiber. The output of each WDM is optical energy extracted thereby from the fiber in the cable, which is directed by means of a monitoring fiber, to one of the fixed fiber locations in the switch array. The output of each light device which, in this embodiment, is a photo-detector aligned with its respective fiber termination, is connected to a power measuring device which includes control circuitry responsive to the power measurement, which controls the operation of the OTDR associated with the monitor switch. Thus, there is a monitoring means for continuously monitoring the presence or absence of light in each of the monitoring fibers, and, hence, of each of the fibers in the cable.

A common fiber is connected to an OTDR which generates a locating signal having a frequency that is different from the signal frequency of the fiber transmission system.

When the power measurement circuitry indicates a fiber failure or fault, through a decrease or loss of signal, the control circuit steps the armature of the switch to the proper fixed fiber which lacks a signal or has a decreased signal and the OTDR generates a fault location signal that is launched through the WDM back along the fiber toward the transmission end until the fault is located and pinpointed. The entire process is performed in a minimum of elapsed time, with the stepping motor speed being the limiting factor.

In another preferred embodiment of the invention, as a monitor for transmit/receive fiber pairs for transmitting signals in, for example, the 1.3 microns band, a first WDM is positioned adjacent the transmit end of a first one of the fibers of the pair, and a second WDM is positioned adjacent the receiver end of that first fiber. A third WDM is positioned adjacent the transmit end of the second fiber of the pair in back-to-back relationship to the second WDM, and a fourth WDM is positioned adjacent the receiver end of the second fiber. The outputs of the first and fourth WDMs are connected to the fixed fiber array of the aforementioned switch. Thus, for N/2 fiber pairs, there are N fixed fibers in the switch array, half of which are connected to the first WDM, and half of which are connected to the fourth WDM. Thus, for each fiber pair there is a group of WDMs, each group comprising one of each of the first, second, third and fourth WDMs. In the second support plate, there are N/2 fixed fibers terminated in Grin-rod lenses and arrayed substantially opposite the fixed fibers connected to the first WDM, and N/2 photo-diodes having band-pass filter terminations, arrayed opposite the fixed fibers connected to the fourth WDMs. A source of test signals of, for example, 1.5 microns band, is connected to the fixed fibers in the second support plate, and the photo-diodes are, as in the foregoing embodiment, connected to control circuitry. The band-pass filters on the photo-diodes are designed to pass 1.5 microns band signals. The common fiber of the switch is connected to, for example, an OTDR.

As will be apparent hereinafter, the armature of the switch has a bifurcated arm mounted thereon or integral therewith which functions to block the 1.5 micron signal destined for the first WDM of the first fiber of a pair when the armature containing the common fiber is opposite the corresponding fixed fiber from the fourth WDM of the pair.

In operation, as will be discussed more fully hereinafter, when the fibers of each of the several pairs are intact, the 1.5 micron test signal travels a loop from the first WDM to the second, third and fourth WDMs and is detected by the appropriate photo-diode. When a break, for example, occurs, the control circuit steps the armature and common fiber to the fixed fiber that has lost signal, while at the same time, the 1.5 micron test signal is blocked by the baffle. The OTDR test signal is applied through the common fiber to the fiber that has lost signal, and the position of the fault in the loop is determined. Thus, monitoring and locating a fault within a fiber pair is accomplished from one end of the pair, while all of the pairs are simultaneously being monitored.

The monitoring system of the present invention materially reduces the complexity and, consequently, the cost of prior art monitoring systems. Further, the basic principles of the monitoring system herein disclosed are applicable to numerous variations of the present monitoring system. These principles and other features of the invention will be more readily apparent from the following detailed description, read in conjunction with the accompanying drawings.

DETAILED DESCRIPTION

Figure 1:
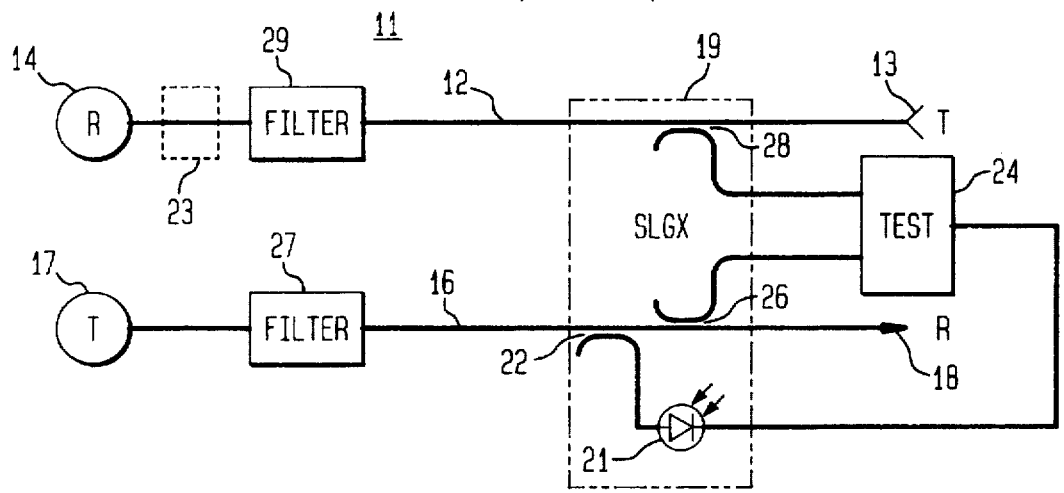
FIG. 1 is a block diagram of a typical prior art fiber monitoring system.

FIG. 1 depicts, in block diagram form, a typical prior art monitoring system 11, which monitors one-half of a signal transmission path from a fixed location. The path comprises, relative to the monitor 11 location, a transmit path 12 extending from a transmitter location 13 to a receiver location 14, and a receiver path 16 extending from a transmitter location 17 to a receiver location 18. An SLGX switch assembly 19 houses a monitor photo-diode 21 which is coupled to the incoming line 16 via a wave division multiplexer (WDM) 22 which taps off of line 16 a portion (−20 dB) of the 1.3 μm being the standard signal transmission frequency. A similar monitor diode 23, shown in dashed lines, can be located adjacent receiver 14. Monitor circuit 11, as shown, monitors only line 16, while the other line 12 of the pair is monitored by photo-diode 23. When diode 21 detects a failure, which is evidenced by a drop or cessation in output of diode 21, a test signal control circuit 24 responds by launching a 1.5 μm test signal on line 16 through NDM 26. This test signal functions as an OTDR signal and will be reflected back from the fiber break, thereby assisting in locating the break or other anomaly. An optical rejection filter 27, located closely adjacent transmitter 17 prevents the test signal from passing into the transmitter 17. A 1.5 μm test signal may also be launched on line 12 when diode 23 indicates the occurrence of an event, through WDM 28. Line 12 also includes an optical rejection filter 29 located closely adjacent receiver 14 to prevent the 1.5 μm test signal from reaching the receiver 14. Filter 27 and 29 also prevent unwanted reflections in the lines 12 and 16. As can be seen from FIG. 1, the system 11 does not monitor both fibers of a fiber pair common to virtually all transmission systems, but, instead, monitors only one fiber, namely, as shown in FIG. 1, fiber 16. It is necessary, for proper monitoring of the pair 12 and 16, that a monitor, such as diode 21 and 23 be located at each end of the transmission link.

Figure 2:
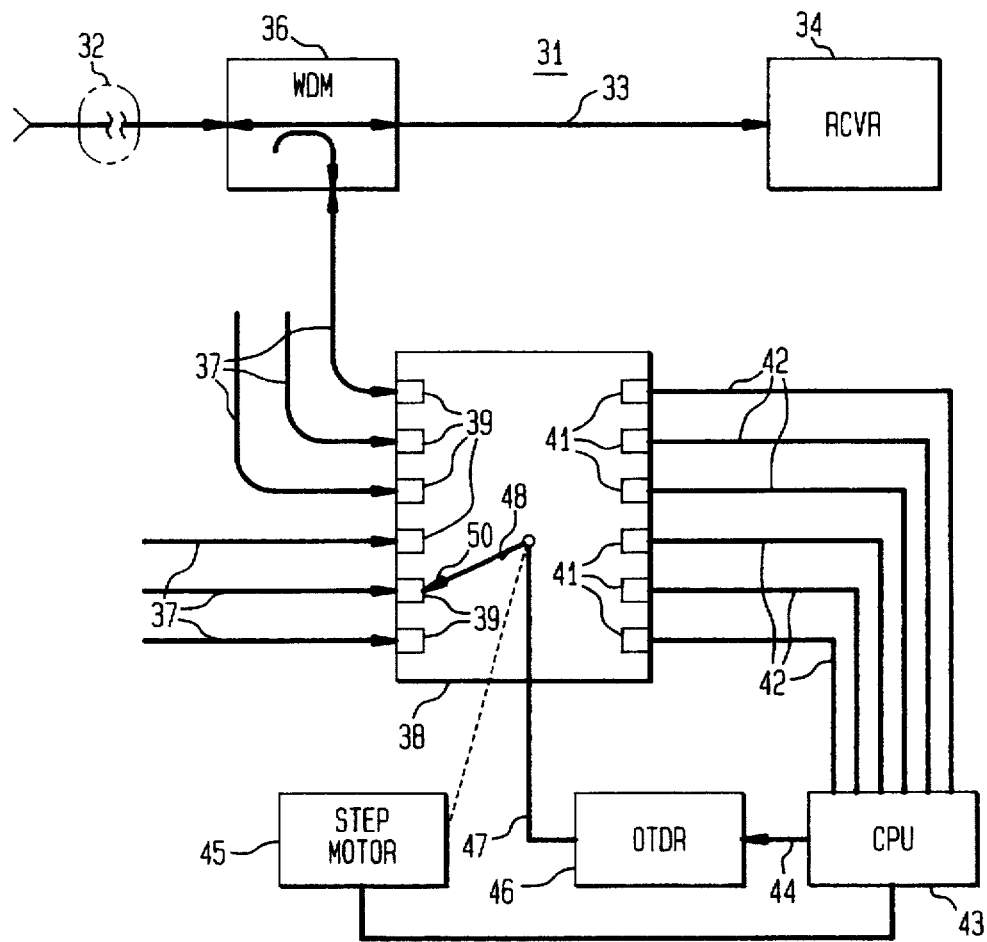
FIG. 2 is a block diagram of a monitoring circuit embodying the principles of the present invention.

In FIG. 2 there is shown the basic monitoring system 31 of the present invention, which utilizes the monitoring switch shown and described in the aforementioned Joe Mock patent application Ser. No. 08/653,373 filed concurrently herewith. The monitoring circuit 31 of FIG. 2 provides real time surveillance and substantially instantaneous monitoring of an optical fiber transmission system and also enables rapid location of a fault in one or more of the fibers in a cable when such fault occurs.

The arrangement of FIG. 2 comprises a system 31 for testing the individual fibers in a transmission cable, designated generally as 32, for example, only a portion of one fiber 33 being shown, adjacent or in proximity to the receiver 34. The fiber 33 passes through a wave division multiplexer (WDM) 36 or other suitable type of signal divider, which launches a portion of the optical energy of fiber 33 onto one of the monitor fibers 37 of switch 38. Each of the fibers in the cable will have its own WDM or the equivalent thereof. As pointed out hereinbefore, signal transmission generally requires two fibers, i.e., transmit/receive or go/return, hence, at the other end of the cable there will be similar WDMs 36 and switches 38 for the other fiber of each pair. The fibers 37 terminate in collimating terminations 39 as discussed in the aforementioned Mock application and the light emitted therefrom is captured and detected by corresponding photo-detectors 41 as explained in that application. The outputs of the photo-detectors are applied through leads 42 to a CPU 43 which may take any of a number of forms for measuring the signal strength on each of the leads 42 preferably independently. The output, or an output, of the CPU 43 is applied through lead 44 to an OTDR 46, and the optical output of the OTDR is directed by common fiber 47 to the armature 48 of the switch 38, which has mounted thereon a collimating fiber termination 50.

In operation, assuming all of the fibers 33 in cable 32 are carrying optical signals, there is a light output from each of the terminations 39 which is focused onto the corresponding photo-detectors 41, whose electrical outputs are applied to CPU 43. Thus, the CPU can give, in one form or another, an indication that the system is functioning properly, and the OTDR 46 is idle. When an event such as a break occurs on a fiber 33, its particular signal does not reach its WDM 36, and hence, does not reach the corresponding fiber termination 39. As a consequence, the corresponding photo-detector 41 does not generate a signal since no light impinges thereon, and its normal signal to the CPU 43 is cut off. The CPU 43 notes the loss of a signal, and is programmed to identify which particular photo-detector 41 and hence, which particular termination 39 and fiber 37 are without signal, and activates stepping motor 45 which moves armature 48 in steps to the termination 39 which lacks a signal. The CPU then activates the OTDR to launch a fault finding signal onto the fiber 47 and hence on to the fiber 37 which passes through the WDM 36 and is directed toward the transmitter end of cable 32. As explained hereinbefore, the reflected OTDR signal, which is fed back into the CPU 43 gives an indication of the distance along the fiber 33 to the fault. Thus, the system 31 of the invention affords a simple, real time monitoring arrangement which makes possible almost instantaneous fault detection and extremely rapid fault location. In addition, in the circuit arrangement of FIG. 2, the optical level measurements are made independently of the mechanical integrity of the switching mechanism. Thus, a switch failure due, for example, to a fault on the stepping motor will not cause a failure of the channel monitoring operation of the photo-diode.

Figure 3:
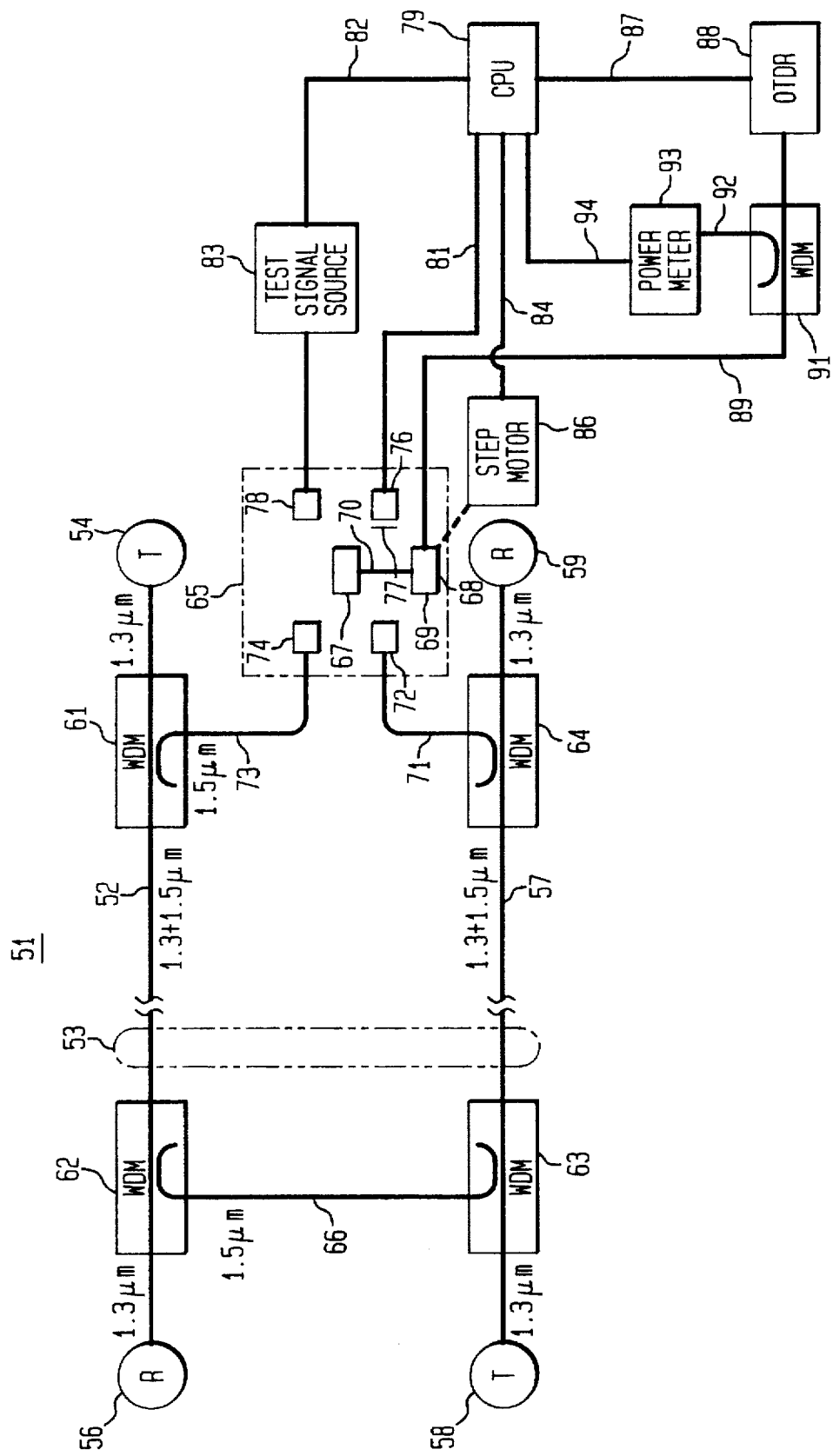
FIG. 3 is a block diagram of a second monitoring system utilizing the principles of the present invention.

The system 31 of FIG. 2 is applicable as a monitor to one fiber of each fiber pair, as was the system of FIG. 1. In FIG. 3 there is shown a monitoring system 51 which monitors both fibers in a transmission pair from a single location, which is preferably fixed in place at one end of the link served by the pair.

Monitoring system 51 as shown in FIG. 3 monitors the first fiber 52 of the fiber pair contained in a cable 53, fiber 52 extending from a transmitter 54 to a receiver 56 and the second fiber 57 of the pair, extending from a transmitter 58 to a receiver 59. Adjacent transmitter 54 is a first WDM 61 and adjacent receiver 56 is a second WDM 62. A third WDM 63 is located adjacent transmitter 58 and a fourth WDM 64 is located adjacent receiver 59. WDM's 62 and 63 are connected together, as shown by a fiber 66 so that optical energy tapped off of line 52 by WDM 62 is launched onto line 57 by WDM 63. WDM 64 extracts energy from line 57 and applies it to switch 65 of the type disclosed in FIG. 2, but more particularly of the type shown in FIGS. 1, 3A and 3B of the aforementioned co-pending Mock application Ser. No. 08/563,373 wherein the armature 70 is bifurcated, having first and second arms 67 and 68, with arm 68 carrying a fiber termination 69. A first group of monitoring fibers and fiber terminations, represented by single fiber 71 and termination 72 receives energy from all of the WDM's 64, in the manner explained hereinbefore. A second group of fibers and fiber terminations, represented by single fiber 73 and terminations 74, each fiber 73 of which is connected to its corresponding WDM 61 is arrayed within switch 65 also. Arrayed opposite the fiber terminations 72 of the first group is an array of photo-diodes represented by the single diode 76, each being aligned with a corresponding termination 72 in the first group. Each of the photo-diodes 76 has a filter 77 which is designed to pass only a 1.5 micron signal. Arrayed opposite the fiber terminations 74 of the second group is an array of fiber terminations represented by the single termination 78, each being aligned with a corresponding termination 74 in the second group.

The output of photo-diodes 76 is electrically connected to a central processing unit (CPU) 79 via connecting wire 81, which monitors the output of the photo-diodes 76. CPU 79 has a first output 82 connected to a 1.5 μm test signal source 83 for applying 1.5 μm test signals to the terminations 78. CPU 79 also has a second output 84 for applying actuating signals to step motor 86, in the manner discussed hereinbefore. A third output 87 is connected to an OTDR 88 for applying OTDR test signals to the fiber termination 69 on armature leg 68, via fiber connection 89.

Located on fiber 89 is a WDM 91 the output 92 of which is connected to an optical power meter 93 having an output 94 connected to the CPU 79. WDM 64 is designed to extract from fiber 57 not only the 1.5 micron test signal, but also a small portion (approximately 1%) of the 1.3 micron transmission signal, which is applied to termination 72 along with approximately 100% of the 1.5 micron signal, however, filter 77 on photo-diode 76 passes only the 1.5 micron signal. On the other hand, termination 69 can receive both signals. WDM 91 is designed to extract the 1.3 micron signal on fiber 89 and apply it to power meter 93, the output of which is applied to CPU 79. Alternatively, power meter 93 may form an integral part of CPU 79 instead of being separate therefrom.

It is to be understood that each of the groups of terminations may contain a wide range of fiber terminations, e.g., from one to twelve or more, and there will be a corresponding number of photo-diodes 76 and terminations 78. Also, CPU 79 may be comprised of a number of individual components instead of a single central computer type processor. Also, other types of energy couplers may be used instead of WDMs, although WDMs have been found to work extremely well. Various types of directional couplers can also be used.

In operation, when conditions are normal, i.e., no "events" or breaks in the fibers 52 and 57, armature 70 of the switch 65 is in its "home" position out of any light path defined within the switch, and signals are being transmitted normally from transmitter 54 to receiver 56 along fiber 52, and from transmitter 58 to receiver 59 along fiber 57. In this case, a 1.5 micron test signal from source 83 is continuously applied through termination 78 and termination 74 to WDM 61 which launches it onto fiber 52. WDM 62 extracts the 1.5 microns signal from fiber 52 and applies it, through fiber 66, to WDM 63 which launches it onto 57 toward receiver 59. WDM 64 extracts this signal and applies it, through fiber 71, to termination 72. Termination 72, which preferably comprises a Grin-rod collimating leans, focuses the 1.5 micron optical signal onto photo-diode 76 whose electrical output is connected via lead 81 to CPU 79. CPU 79 measures the electrical power thus received and remains "quiescent" as long as the power is above predetermined minimum level. In this state, the small amount of 1.3 micron signal on termination 72 is blocked by filter 77 and is not utilized.

When an event, such as a signal fiber break occurs, the CPU 79 notes a failure to receive the test signal output from one of the photo-diodes 76, which it identifies, and initiates a search sequence. Step motor 86 moves armature 70 in steps until arm 68 and termination 69 are aligned with the fiber termination 72 which has lost signal as evidenced by its corresponding photo-diode 76. At the same time, arm 67 is moved to block the corresponding transmit termination 74 in the second group; thereby blocking any further transmission of the 1.5 micron test signal along that particular path. If, with the armature 70 and arms 67 and 68 thus positioned, the power meter 93 indicates an acceptable level of the 1.3 micron signal, then this serves as an indication that transmission fiber 57 is not the culprit. If, on the other hand, the power level of the 1.3 micron signal is below the acceptable minimum, CPU 79 activates OTDR 88 to locate the break in the manner described hereinbefore, which should be, on the basis of the foregoing somewhere in fiber 57.

If all of the terminations 72 have an acceptable optical power level thereon, then fiber 52 can be tested in the same manner by stepping armature 70 and termination 68 to align with each of the terminations 74, thereby blocking the 1.5 micron test signal, and launching an OTDR test signal onto each fiber 52 in turn. Inasmuch as there is no 1.3 micron signal on termination 74, the OTDR signal must be launched on each termination 74 in turn until OTDR 88 indicates a break location.

The monitoring system of the present invention affords complete, real time monitoring and fault location in signal transmission fiber pairs from a signal fixed position. While the principles of the invention have been demonstrated utilizing the unique switch of the aforementioned Mock application, it is quite possible that workers in the art might use other types of switching arrangements without departure from the spirit and scope of the invention. Thus, it should be noted that it will be obvious to those skilled in the art that many variations and modifications may be made to the preferred embodiment without any substantial departure from the principles of the present invention. All such variations and modifications are intended to be included herein as being within the scope of the present invention as set forth in the claims. Further, in the claims as set forth hereinafter, the corresponding structures, materials, acts and equivalents of all means or step-plus-function elements are intended to include any structure, material, or acts for performing the functions in combination with other claimed elements as specifically set forth in the claims.

The claims:

1. An optical fiber monitoring system for continuously monitoring the condition of optical fibers comprising:

a plurality of individual means for extracting optical energy from a plurality of optical fibers, each of said means being adapted to extract optical energy from one fiber of the plurality of optical fibers;

means for applying the extracted energy to a monitoring means comprising a monitoring fiber extending from each of said individual means for extracting and having a fiber termination in said monitoring means, said monitoring means including means for responding to the presence of the optical energy for generating a signal indicative of the optical energy level;

measuring means for receiving the signal thus generated for ascertaining when the optical energy indicates an optical fiber fault;

locating means under control of said measuring means for generating a fault locating signal; and means for launching the fault locating signal on to the optical fiber.

2. An optical fiber monitoring system as claimed in claim 1 wherein said termination of each of said monitoring fibers includes means for forming optical energy emerging from said terminations.

3. An optical fiber monitoring system as claimed in claim 2 wherein said monitoring means has a plurality of light devices spaced from said fiber termination, each one of said light devices being aligned with one of said fiber terminations for receiving optical energy emerging therefrom.

4. An optical fiber monitoring system as claimed in claim 1 wherein said means for responding comprises at least one photodetector.

5. An optical fiber monitoring system as claimed in claim 1 wherein said locating means comprises a reflectometer.

6. An optical fiber monitoring system as claimed in claim 1 wherein said means for launching the fault locating signal comprises an optical fiber having a terminated end and a second end connected to said locating means for transmitting the fault locating signal.

7. An optical fiber monitoring system as claimed in claim 6 wherein said terminated end is adapted to be positioned adjacent to and spaced from said means for applying the extracted energy for applying the directing energy therethrough to the optical fiber.

8. An optical fiber monitoring system for continuously monitoring the condition of optical fibers comprising:

a monitoring member;

means for generating a test signal and passing it through said monitoring member;

first means for applying the test signal to a first optical fiber of an optical fiber pair;

second means remote from said first means for extracting the test signal from the first optical fiber;

third means for receiving the signal extracted by said second means for applying it to the second optical fiber of the optical fiber pair;

fourth means remote from said third means for extracting the test signal from the second optical fiber and applying it to the monitoring member;

means responsive to the optical signal applied to said monitoring means for generating a signal indicative of the optical signal level;

measuring means for receiving the signal thus generated for ascertaining when the optical energy indicates an optical fiber fault;

locating means under control of said measuring means for generating a fault locating signal when said measuring means detects an optical fiber fault in one of the first and second fibers of the optical fiber pair; and means for launching the fault locating signal on to the one optical fiber.

9. An optical fiber monitoring system as claimed in claim 8 and further including means for blocking the test signal from one of the fibers under test when the fault locating signal is launched on to the other fiber of the fiber pair.

10. An optical fiber monitoring system as claimed in claim 8 wherein at least one of said first, second, third and fourth means is a wavelength division multiplexer.

11. An optical fiber monitoring system as claimed in claim 8 wherein each of said first, second, third and fourth means is a wavelength division multiplexer.

12. An optical fiber monitoring system as claimed in claim 8 wherein there is a plurality of groups comprising said first, second, third, and fourth means, each one of said groups being adapted to function with a single fiber pair.

13. An optical fiber monitoring system as claimed in claim 12 wherein said monitoring member includes means for simultaneously applying the test signal to the first fiber of each of a plurality of fiber pairs.

14. An optical fiber monitoring system as claimed in claim 12 wherein said monitoring member includes a plurality of said means responsive to the optical signal applied to said monitoring means from said fourth means.

15. An optical fiber monitoring system as claimed in claim 8 wherein the optical fibers being monitored are adapted to transmit optical signals in a first frequency band, and said test signal is in a second different frequency band.

16. An optical fiber monitoring system as claimed in claim 15 and further including means for measuring the optical signal strength of signals at the first frequency.

17. A method of continuously monitoring the condition of optical fibers adapted to transmit signals in a first frequency band comprising the steps of extracting an optical signal from a fiber being monitored;

directing and applying the signal to a monitoring member by means of a fiber member having a light emitting termination in the monitoring member;

detecting the light or absence thereof emerging from the termination and generating a monitor signal indicative of the energy thereof;

applying the monitor signal to a power measuring device to generate a control signal when the monitor signal indicates a fault in the fiber because of insufficient light emerging from the termination;

applying the control signal to a fault locating means for generating a fault location signal; and selectively applying the fault location signal to the fiber termination having insufficient light emerging therefrom.

18. The method as claimed in claim 17 wherein the step of extracting an optical signal comprises simultaneously extracting a signal from each of a plurality of fibers being monitored.

19. The method as claimed in claim 18 wherein the step of directing and applying the signal to a monitoring member comprises simultaneously directing and applying the signal from each of the plurality of fibers to the monitoring member.

20. The method as claimed in claim 19 wherein the step of detecting the light emerging from the termination comprises simultaneously detecting the light emerging from the termination of each of a plurality of terminations in the monitoring means.

21. A method of continuously monitoring the condition of optical fiber pairs adapted to transmit signals in a first frequency band comprising the steps of generating a test signal in a frequency band different from the frequency band of the transmission signals in the fiber pairs;

applying the test signal to the first fiber of the fiber pair at a first location thereon;

extracting the test signal from the first fiber at a second location removed from the first location;

applying the extracted test signal to the second fiber of the fiber pair substantially at the second location;

extracting the test signal from the second fiber substantially at the first location and applying it to a monitoring member;

detecting and measuring the strength of the test signal and generating a first control signal when the strength of the detected test signal is insufficient;

generating a fault location signal by means of the control signal; and applying the fault location signal to the second fiber of the fiber pair.

22. The method as claimed in claim 21 and further including the step of blocking the test signal from the first fiber of the optical fiber pair when applying the fault location signal to the second fiber of the pair.

23. A method as claimed in claim 22 and further including the step of measuring the strength of the signal in the first frequency band transmitted by the fiber pair.

24. The method as claimed in claim 22 wherein the step of applying the test signal to the first fiber of a pair comprises simultaneously applying the test signal to each of a plurality of first fibers of a plurality of fiber pairs.

25. The method as claimed in claim 24 wherein the steps of extracting the test signal from the first fiber and applying it to the second fiber of the fiber pair comprises simultaneously extracting the signals from a plurality of first fibers and applying the signals to a plurality of corresponding second fibers.

26. The method as claimed in claim 25 wherein the step of applying the signal to a monitoring member comprises simultaneously applying the signals from a plurality of second fibers to the monitoring member.

27. A method as claimed in claim 26 wherein the step of detecting and measuring the strength of the test signal comprises simultaneously detecting and measuring signals from a plurality of second fibers of the fiber pairs.

28. An optical fiber monitoring system for continuously monitoring the condition of one or more optical fibers comprising:

means for extracting a portion of the optical energy from an optical energy bearing optical fiber;

means for applying the extracted energy to a monitoring means, said monitoring means including means for responding to the presence of the optical energy for generating a signal indicative of the optical energy level;

measuring means for receiving the signal thus generated for ascertaining when the optical energy indicates an optical fiber fault and identifying the fiber having the fault;

locating means under control of said measuring means for generating a fault locating signal; and means for selectively launching the fault locating signal on to the fiber having the fault to the exclusion of other fibers.

29. An optical fiber monitoring system as claimed in claim 28 wherein said means for extracting optical energy comprises a plurality of individual extracting means, each of said individual extracting means being adapted to extract optical energy from one of a plurality of optical fibers.

* * * * *